July 17, 1956        A. R. MORE        2,754,675

COMPRESSION PLASTIMETER

Filed Nov 5, 1952        3 Sheets—Sheet 1

Inventor:
Arthur Rowlett More.
by [signature]
Attorney

July 17, 1956  A. R. MORE  2,754,675
COMPRESSION PLASTIMETER
Filed Nov 5, 1952  3 Sheets-Sheet 2

Inventor:
Arthur Rowlatt More

United States Patent Office 2,754,675
Patented July 17, 1956

2,754,675

COMPRESSION PLASTIMETER

Arthur Rowlatt More, Croydon, England, assignor to H. W. Wallace & Company Limited, Croydon, England Application November 5, 1952, Serial No. 318,914

9 Claims. (Cl. 73—15.6)

This invention relates to compression plastimeters, in particular to plastimeters for testing rubber of the kind in which a sample of the rubber to be tested is placed between a first and second platen, heat is applied to the rubber and the extent to which the sample is compressed upon application of pressure between the platens over a given period of time is an indication of the plasticity of the rubber.

In one known method of testing rubber, a pellet is formed of precise dimensions and temperature preparatory to inserting it between the parallel faced platens of a testing press in which the extent of compression under a standard load at a standard temperature during a predetermined period of time indicates the plasticity of the rubber. Such a method should be conducted by persons having a considerable degree of skill and also takes some time to complete.

The object of the present invention is to provide a plastimeter for testing in particular rubber, which can be operated by a person not possessing a high degree of skill and in a comparatively short period of time.

The invention consists in a plastimeter of the kind referred to characterised in being adapted to receive a sample of rubber or other plastic material and initially form it to the required thickness for testing by the movement of the first platen in relation to the second platen while the latter is fixed in relation to the frame of the instrument, and test the sample by the movement of the second platen in relation to the first platen while the latter is fixed in relation to the frame of the instrument.

A further feature of the invention is that one or both platens are heated to a predetermined temperature both while the sample is being prepared and during the testing period.

A still further feature of the invention is that the period of time during which pressure is applied both initially and during the test is regulated by a clock-like mechanism, the latter also controlling the transfer of the load from one platen to the other.

The accompanying drawings show by way of example only one form of construction in accordance with the invention, in which.

Figure 1:
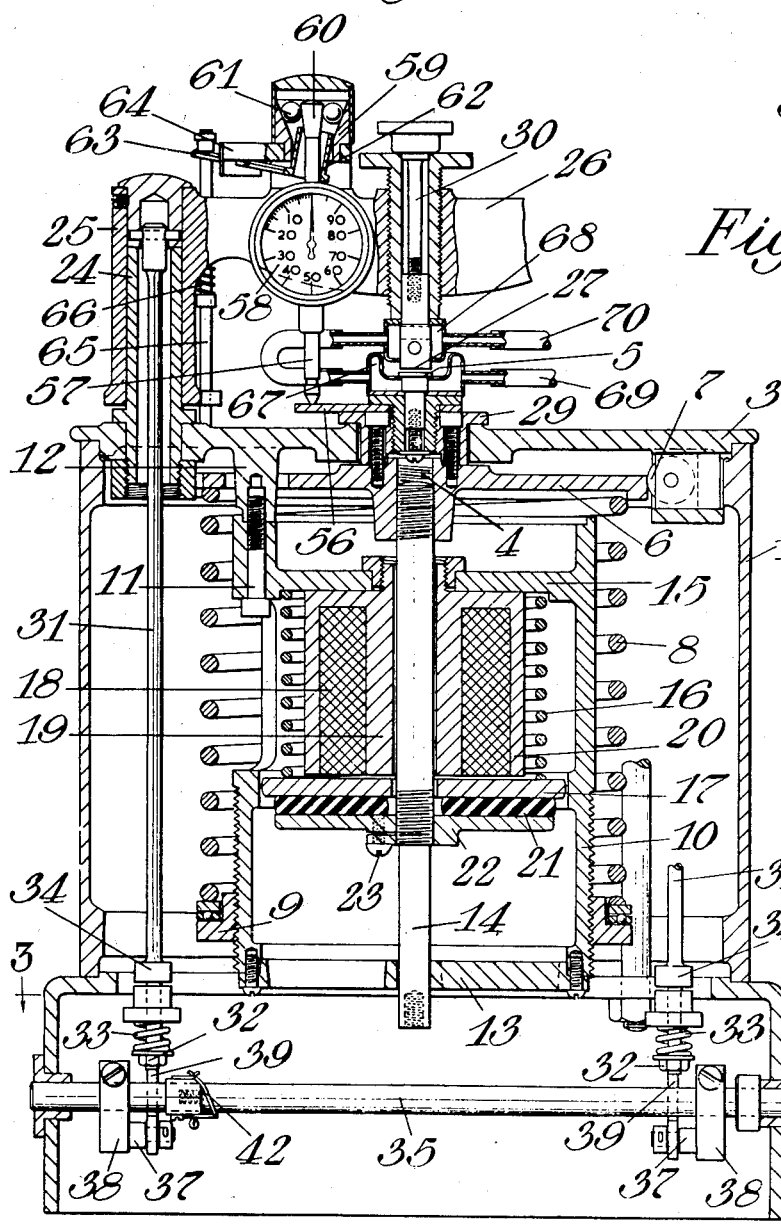
Figure 1 is a section on the vertical axis of the device.

The instrument is provided with a vertical cylindrical housing 1 which is attached to a square hollow base 2, the top of the cylinder being closed by a circular top plate 3. The height of the housing can conveniently be made about equal to its diameter. The centre of the top plate is provided with an axial hole which provides considerable clearance for an axial rod assembly 4 which carries at its upper end the lower platen 5 of a pair of platens. Screw threaded upon the axial rod there is provided a guide plate 6 which, besides acting at its periphery in cooperation with at least three rollers 7 (only one of which is shown) upon the top plate 3 as a centering device, also acts as an abutment for the upper part of a main coaxial helical loading spring 8 contained within the housing 1. The lower end of this helical spring rests upon a screw threaded ring 9 adjustable as to height in the housing by rotation upon a corresponding screw threaded coaxial cylinder 10 within the spring supported by bolts 11 at its upper end from dependent pillars 12 on the top plate passing through clearance holes in the guide plate 6. The lower end of the coaxial cylinder is provided with radial arms 13 supporting a bearing which acts as a guide for the lower end 14 of the axial rod 4.

Towards the other end of the coaxial cylinder and internally of the same there is provided a plate 15 integral therewith having a clearance hole for the axial rod, the plate acting as the upper abutment for a smaller helical unloading spring 16 (which exerts a thrust greater than spring 8) contained in the coaxial cylinder, the lower end of the spring abutting a loose plate 17 which is of such diameter as to clear the inner periphery of the coaxial cylinder and which has a hole therein to clear the axial rod. This loose plate 17 serves as the armature of an electromagnet 18 contained in and situated axially of the coaxial cylinder, the one pole 19 being in the form of a cylinder close around but separated from the axial rod while the other pole 20 is in the form of a cylinder adjacent the inner periphery of the smaller helical spring. The winding of the magnet is situated between the poles. Openings are provided in the side of the coaxial cylinder 10 for the electrical leads to the magnet coil. When the magnet is energised the armature 17 is lifted and the pressure of the smaller and stronger helical spring 16 is exerted between the armature plate and the plate 15 associated with the casing of the instrument, while when the magnet is inoperative the armature plate is biased by the spring 16 against a rubber washer 21 upon a circular plate 22 which latter plate is in turn threaded upon the axial rod 4 and locked by the bolt 23, so that the pressure of the smaller spring 16 is placed in overpowering opposition to that of the main helical spring 8, the resultant pressure upward of the lower platen by spring 8 thus being overcome.

Figure 2:
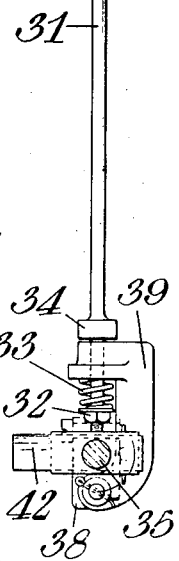
Figure 2 is a section taken through one of the beam supporting pillars.
Figure 3:
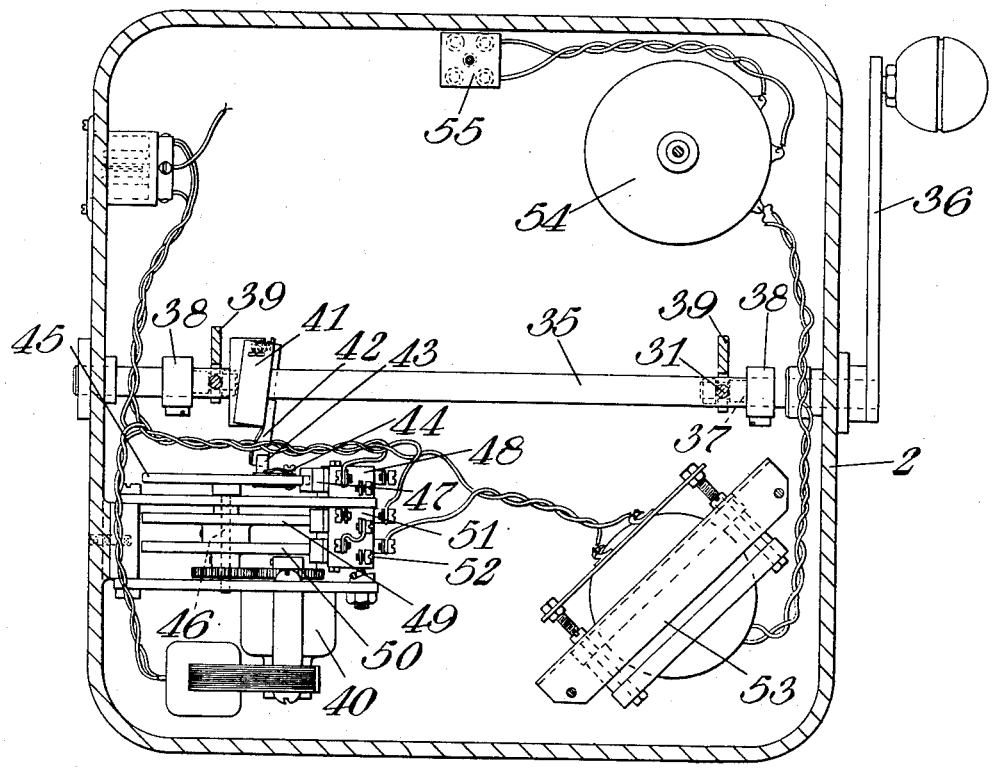
Figure 3 is a plan view taken on the line 3—3 of Figure 1.
Figure 4:
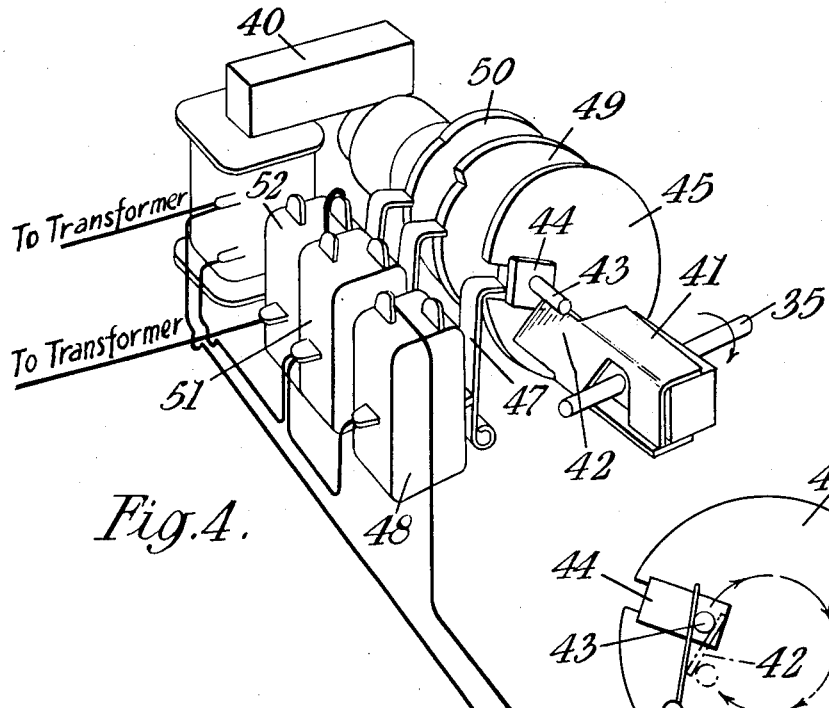
Figure 4 is a perspective view of the clock-like mechanism.
Figure 6:
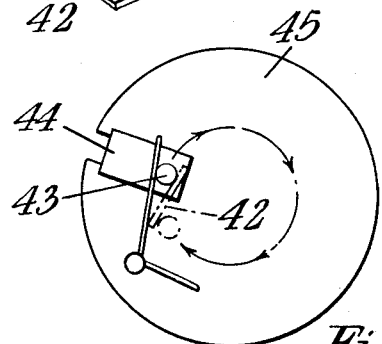
Figure 6 is a side view of one of the switch-actuating discs of the clock-like mechanism.
Figure 5:
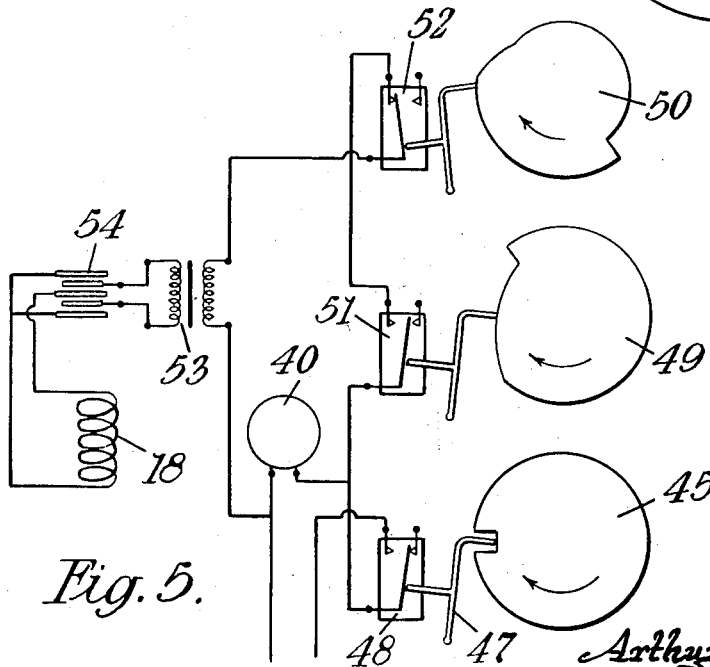
Figure 5 is a diagrammatic sketch showing the shapes and operating relationship of the switch-actuating discs of the clock-like mechanism.

The upper surface of the top plate is provided with a pair of vertical tubular pillars 24 diametrically opposite to one another (only one being shown in Fig. 1) which act as guides for tubular end pieces 25 of a pressure beam 26 which bridges the lower platen and carries at its centre the upper platen 27. The guides are formed at their upper ends with abutments 28 (Fig. 2) for co-operation with abutting surfaces in the end pieces so that in the lower position the beam returns always to a fixed height above the top plate. The top plate is provided with a washer 29 overhanging the clearance hole therein for the axial rod upon which a flange on the latter rests when the rod is in its lowermost position. The upper platen is carried at the lower end of a threaded screw 30 in the centre of the beam which allows the adjustment of the clearance between the platens to the required distance when the beam is lowered and the axial rod 4 is at its lowest point.

Each of the tubular end pieces of the beam are provided with pull rods 31, hingedly attached thereto, which pass down the hollow tubular pillars and through the housing into the base. The pull rods carry nuts 32 at their lower ends which support helical springs 33, a collar 34 in each case being provided above the spring whereby resilient pressure can be exerted through these rods upon the upper platen when a sample greater in thickness than the clearance distance is placed between the platens.

An operating rod 35 provided at one end with an operating lever 36 is provided across the base of the instrument and fitted with a pair of cranks 37 and levers 38 which in one position of the operating lever urge the members 39 on the two pull rods upwardly to make contact with the fixed collars 34 to raise the beam 26 and so provide adequate clearance between the platens for the insertion of the sample, while in the other position pull downwardly on the springs 33 to provide the necessary initial pressure upon the sample to cause it to assume the initial thickness.

A synchronous electric motor 40 is provided in the base which is switched on as soon as the operating lever is moved to close the platens. This is achieved by means of the spring loaded pivotable lever 41 which has an obliquely positioned surface 42 which engages the pin 43 projecting from a carrier 44 slidable radically in a groove in the disc 45 fastened to the shaft 46 of a multiple switch assembly. The end of the operating lever 47 of the microswitch 48 is normally positioned in the outer end of the groove when the switch is open, but when the carrier is moved radially the lever is moved to close the switch and start the motor. The motor continues to rotate so that the disc makes one revolution as the switch lever is held closed by the edge of the disc, but when the one revolution has been completed the carrier has already become free of the face of the lever 41 and consequently the radial groove is again open and the switch falls into it and the motor stops.

The cam like discs 49 and 50 operate the microswitches 51 and 52 at the appropriate times to close and open the primary circuit of the transformer 53 which in its turn is connected via the metal rectifier 54 by way of the terminal block 55 to the magnet 18. The magnet, after a predetermined period of time removes the opposing pressure of the small helical spring. The full pressure of the main spring is then operative for a further predetermined period, after which the magnet is switched off and the test completed.

As the test for plasticity essentially consists in gauging the extent by which the sample is compressed, the lower platen 5 is provided with a projection 56 upon which the needle 57 of a dial micrometer 58 rests, the body of the micrometer being supported above the projection by the beam 26. The micrometer is preferably of the self-locking or maximum reading type.

The self-locking is obtained in the construction illustrated by providing a conical hollow member 59 concentric with the needle which has a conical end 60 of lesser angle than that of the hollow member, so that the steel balls 61 fall slightly when the needle is raised, thereby wedging it in position and maintaining the maximum reading. The micrometer is reset automatically when the beam is raised at the completion of a test by means of the cylindrical members 62 at one end of the lever 63 pivoted, where it passes through a slot in the member 64. The other end of the lever is pivoted on the rod 65 which passes through the end of the beam and bears at its lower end on the top plate 3, being urged to remain in contact therewith by means of the spring 66. When the beam is lowered the balls are released and the micrometer set at zero for the next test.

The platens are provided with hollow jackets 67 and 68 into which steam passes by way of the flexible hose 69 and returns by way of the hose 70, the platens thus being heated to the standard temperature of 100° C.

The method of operation of the device is as follows: A sample of the material to be tested is punched or cut in the form of a disc of 10 mm. diameter and of a greater thickness than 1 mm. and preferably not more than 2 mm. The beam of the instrument, and with it the top platen, is raised by means of the operating lever and the sample placed on the lower platen. On lowering the upper platen the dial micrometer is automatically set and the sample is at first loaded by means of the springs on the pull rods while at the same time being raised in temperature by steam passing through the jackets. As soon as the upper platen is lowered the clock-like controlling mechanism is started automatically. Before a period of 10 seconds has expired the sample will be compressed to the standard thickness of 1 mm. preparatory to the test proper being commenced. At 10 seconds from the closing of the platens, the magnet is energised automatically and the opposing load of the small helical spring is removed from the main spring thereby allowing the full pressure of 10 kg. to be applied between the platens. This pressure is maintained for 15 seconds after which the magnet is switched off by the clock-like mechanism and the reading can be taken from the micrometer.

The platens are made to be interchangeable with smaller ones of half the area for use with stiff rubbers. Electrical means may be used to heat the platens directly or indirectly and other details for carrying the invention into effect may be varied without departing from the scope of the invention.

I claim:

1. Plastimeter of the kind referred to comprising a cylindrical housing, a first steam heated platen and a second steam heated platen mounted coaxially of the housing for movement towards and away from one another in relation to the housing, a base for the housing, manually operable lever and crank means mounted on said base and adapted to move the first platen towards the second platen to a predetermined distance therefrom while the latter is held in one of its extreme positions against an abutment on the housing, for initially forming a sample of plastic material between the platens to the required thickness for testing, a synchronous electric motor driven clock-like mechanism in the base, electric switch means operated by cams driven by the clock-like mechanism, a circuit adapted to extend from a source of electric current to said motor, an electric switch in said circuit operated by the manually operable lever and crank means to switch on the motor, a helical loading spring for applying a predetermined standard pressure to urge the said second platen towards the first platen while the latter is held against an abutment on the housing by the lever and crank means, a helical unloading spring working in opposition to and exerting a greater force than the said loading spring, a circuit adapted to extend from a source of electric current to said electromagnet, an armature operable by the electromagnet and mounted to compress the unloading spring for removing the opposition of said unloading spring to the loading spring when the electromagnet is energized, the cam-operated electric switch means being interposed in the circuit of said electromagnet and operable in sequence by the cams to close and open the circuit to said electromagnet, whereby actuation of the manually operated lever and crank means results in causing current to the magnet to be switched on by the electric switch means after a predetermined period of time required for the initial forming of the sample, and switched off after a predetermined period of time required for the test, followed by the automatic switching off of the current to the motor at the completion of one cycle of operation of the cams, and a micrometer gauge means mounting said gauge for movement with one of said platens and said gauge being contactable with an abutment upon the other of said platens whereby to indicate the dimensions by which the two platens are closed together during the test period.

2. Plastimeter as claimed in claim 1 in which the second platen is mounted on one end of an axially movable rod-like assembly concentric with the helical loading spring, the helical unloading spring and the electromagnet, the magnet being in the form of a pot magnet, and the armature operable by the electromagnet comprising a disc movably mounted upon the rod-like assembly and urged by the unloading spring to engage an abutment upon said rod-like assembly in the unenergized condition of the electromagnet.

3. Plastimeter as claimed in claim 2 in which a guide plate is fixedly connected to said rod-like assembly intermediate its length and the loading spring is interposed between the guide plate and a stationary part of the housing, and the unloading spring is interposed between the stationary part of the housing and the armature disc.

4. Plastimeter as claimed in claim 1 in which the first platen is supported upon a beam mounted upon and disposed transversely of the housing at one end of the housing, and screw-threaded means secured to said beam for adjusting the position of the first platen, toward and from the second platen.

5. Plastimeter as claimed in claim 1 in which the first platen is supported upon a beam mounted upon and disposed transversely of the housing at one end of the housing, and pull rods connected to and extending between the beam and the manually-operable lever and crank means by which the first platen is moved towards the second platen to a position determined by surfaces on the beam abutting surfaces on the housing of the plastimeter.

6. Plastimeter as claimed in claim 1 in which the first platen is supported upon a beam mounted upon and disposed transversely of the housing at one end of the housing, and pull rods connected to and extending between the beam and the manually-operable lever and crank, the micrometer gauge being of the maximum-reading type and being supported upon said beam, said gauge having a gauge-operating needle adapted to bear against a projection secured to the second platen, said needle having a conical portion, a hollow, conical member upon the beam surrounding the conical portion of the needle, the conical portion of the needle being tapered in the same direction as the conical portion of the hollow conical member but at a lesser angle and a plurality of balls contained in the hollow, conical member adapted to wedge between the conical surfaces of the conical member and the conical portion of the needle, whereby the needle is retained in its most elevated position by the wedging action of the balls.

7. A plastimeter comprising a housing, a first platen and a second platen both movably mounted upon the housing, a manually-operable lever, linkage connecting the lever with the first platen for moving the first platen toward the second platen, resilient means interposed in said linkage for causing pressure exerted by said lever to be yieldingly transmitted through said linkage to said first platen, an abutment for limiting the approach of the first platen to the second platen to a predetermined distance for initially forming a sample of plastic material between the platens to the required thickness for testing, a loading spring applying a predetermined standard pressure to subsequently urge the second platen toward the first platen to test the sample, means maintaining said first platen against movement while the other platen is moving, means for relieving the pressure of the loading spring from the second platen, indicating means for indicating the extent of relative movement between the platens, and a clock-like mechanism controlling the operation of the pressure relieving means of the loading spring, whereby the sample is subjected to the pressure of the second platen for a predetermined interval of time.

8. A plastimeter as set forth in claim 7 in which the means for relieving the pressure of the loading spring from the second platen comprises an unloading spring mounted to normally exert a thrust of greater force and in opposition to the loading spring, and means controlled by the clock-like mechanism for periodically rendering the unloading spring ineffective.

9. A plastimeter as set forth in claim 7 in which the means for relieving the pressure of the loading spring from the second platen comprises an unloading spring mounted to normally exert a thrust of greater force and in opposition to the loading spring, an electromagnet, an armature disc adapted to be attracted by the electromagnet and providing a bearing for one end of the unloading spring, a circuit extending from a source of electric current and including the electromagnet, and switch means adapted to be sequentially closed and opened by the clock-like mechanism for moving the armature disc to periodically render the unloading spring ineffective.

References Cited in the file of this patent

UNITED STATES PATENTS

| 1,846,048 | Desautels | Feb. 23, 1932 |
| 1,908,412 | Domina | May 9, 1933 |
| 1,952,523 | Abbott | Mar. 27, 1934 |
| 2,619,831 | Sklar | Dec. 2, 1952 |

FOREIGN PATENTS

| 148,050 | Australia | Sept. 4, 1952 |
| 523,064 | Germany | Apr. 18, 1931 |